Sept. 17, 1929.    C. B. COMSTOCK    1,728,664
BAKER'S OVEN
Filed June 3, 1926    2 Sheets-Sheet 1

Inventor
Corry B. Comstock
By Cushman, Bryant Darby
Attorneys

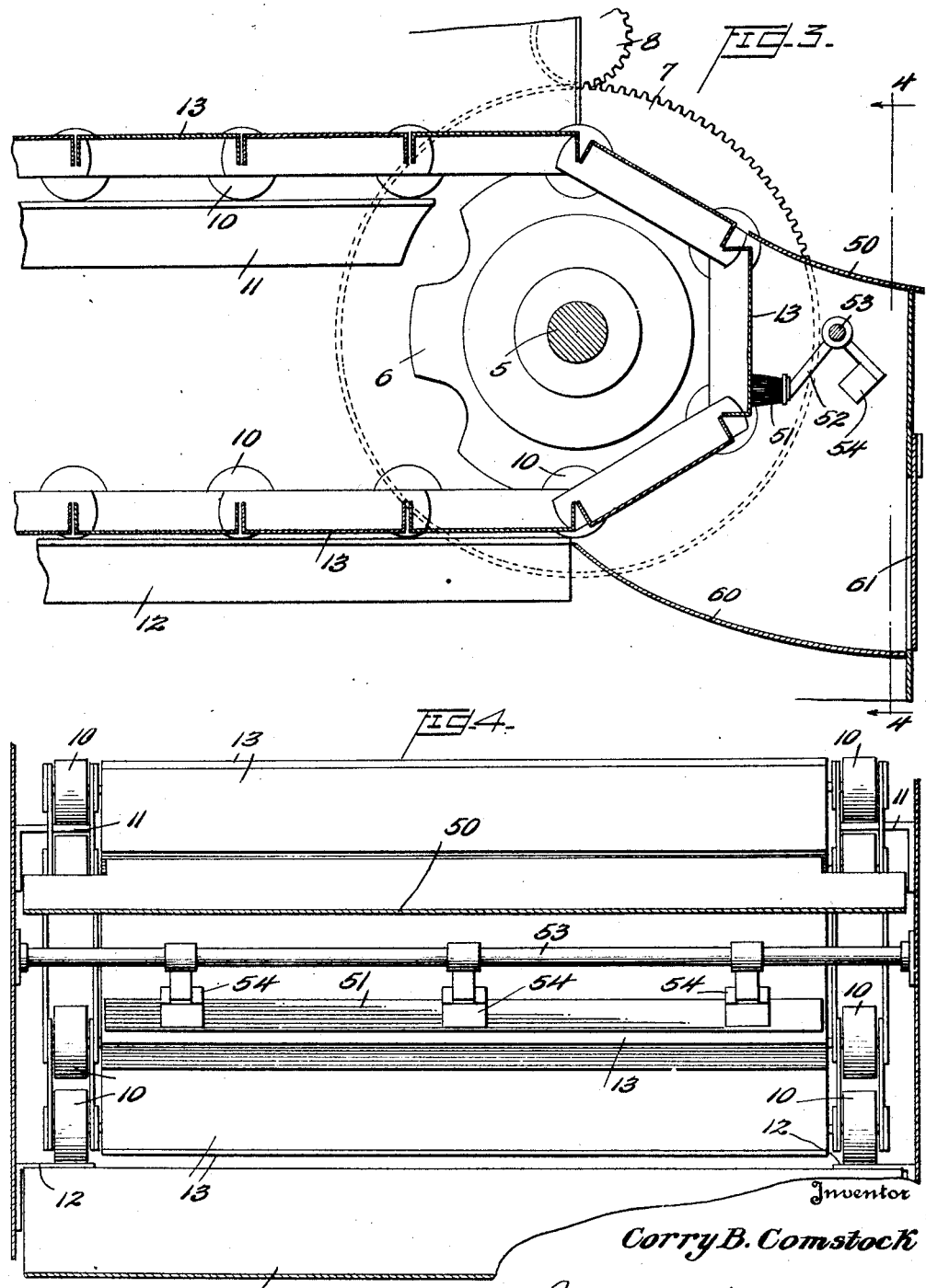

Patented Sept. 17, 1929

1,728,664

UNITED STATES PATENT OFFICE

CORRY B. COMSTOCK, OF NEW YORK, N. Y., ASSIGNOR TO COMSTOCK OVEN COMPANY, INC., OF NEW YORK, N. Y., A CORPORATION OF NEW YORK

BAKER'S OVEN

Application filed June 3, 1926. Serial No. 113,508.

The present invention relates to improvements in bakers' ovens of the type in which the products to be baked are carried through a baking chamber by an endless conveyor. More particularly the present improvements are, in part, designed for use with ovens of the character referred to in which the conveyor travels in a substantially horizontal direction and comprises a series of plate-like flights supported at their ends by roller chains.

Some of the features of the present invention are improvements upon the oven of an earlier application, Serial No. 88,611, filed Feb. 16, 1926. Like the subject matter of said earlier application the oven of the present case includes means for spraying low pressure steam upon the articles to be baked while they are supported on the endless conveyor near the receiving end of the baking chamber. According to the invention of the earlier case, means are provided whereby any surplus steam thus sprayed upon the loaves of bread, for example, is withdrawn through apertures formed in a vertically movable door or slide which constitutes a closure for the feed opening to the baking chamber.

Experience with the construction of oven illustrated in said application has shown that at times the gases, etc., withdrawn through the apertures in the door at the entrance to the baking chamber are so hot that the steam discharged from the spray devices is superheated and not deposited as a thin film of water upon the loaves on the conveyor as is desired.

One of the objects of the present invention is to overcome this objection to the construction shown in said earlier application and provide means by which the withdrawal of the surplus spraying steam may be more accurately controlled and the deposit of a suitable water film upon the loaves to be baked insured.

A further object of the present improvements is to effectually clean the operative surfaces of the flights of the endless conveyor after each traverse of the baking chamber so that particles adhering thereto will not be returned into the baking chamber and consumed by the heat therein, which is an objection to oven structures commonly in use. Such cleaning of the conveyor flights is particularly important when baking what is termed "hearth" bread, wherein the loaves or dough masses are deposited directly upon the surfaces of the conveyor flights which are frequently preliminarily sprinkled with corn meal or similar substance.

With the foregoing and other objects in view the invention consists in the construction and arrangement of parts that will be hereinafter described, reference being made in this connection to the accompanying drawings, in which:—

Figure 3 is a section similar to Figure 1, on a slightly enlarged scale, of the delivery end of the improved oven.

Figure 4 is an end elevation, and partial section substantially on the line 4—4 of Figure 3.

Figure 1:
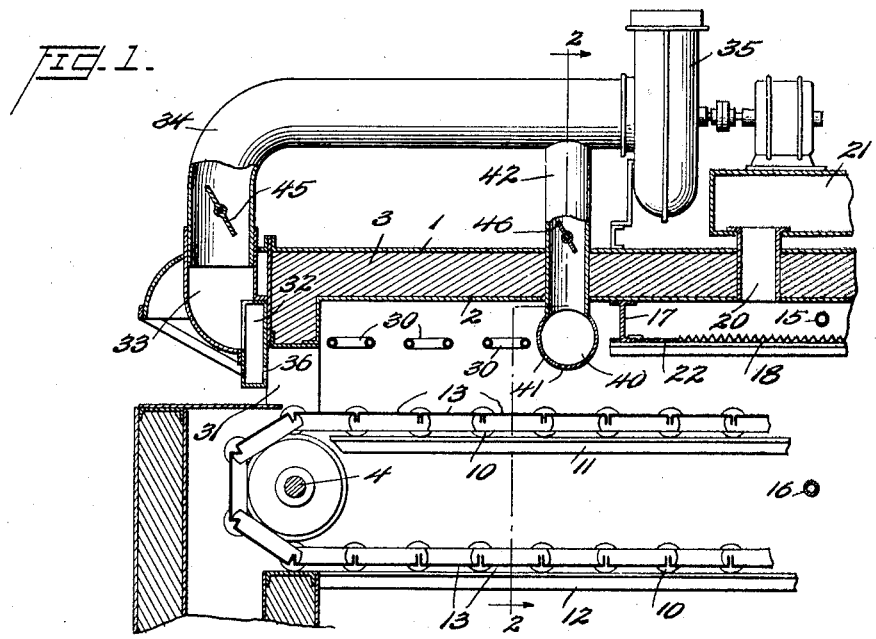
Figure 1 is a vertical section of the front or feed end of a baker's oven, constructed in accordance with the present invention.
Figure 2:
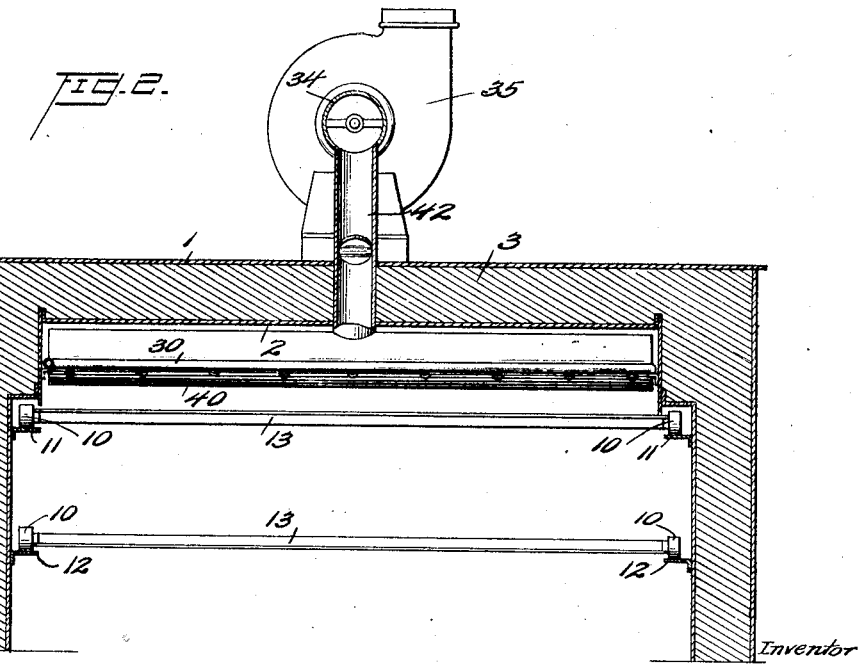
Figure 2 is a transverse section substantially on the line 2—2 of Figure 1.

Referring to the drawings, in the several figures of which like reference characters designate corresponding parts, the body of the improved oven is shown as having double walls formed by metal plates 1, 2, which are separated by a body 3 of any suitable refractory or poor heat conducting material in the usual manner.

The baking chamber formed by said casing provides a support for two shafts, 4, 5, located, respectively, adjacent the inlet and discharge, ends of the oven and on said shafts are secured drums and sprockets 6, which support the chains of the endless conveyor by which the articles to be baked are moved through the baking chamber.

As shown, the shaft 5 adjacent the delivery end of the oven is the driving shaft and movement is imparted thereto and through the sprockets 6 thereon to the conveyor by gears 7, 8, driven by any suitable source of power, not illustrated.

The endless conveyor comprises parallel chains having supporting rolls 10, which travel along horizontal tracks 11, 12, extending longitudinally of the oven chamber and are received in the gaps between the several teeth of the driving sprocket 6. The links of the endless chains are connected by plate-like flights 13, which, as shown, have flanges extending at substantially right angles to the faces thereof and, when the flights are traveling in a horizontal direction, the flanges of adjacent flights lie close together so that a practically continuous supporting surface is provided from adjacent the inlet end of the baking chamber to the discharge end thereof.

The baking chamber may be heated by any suitable means. For purposes of illustration I have shown heating means of the same character as that of my earlier application, the same comprising two series of gas burners 15, 16, arranged, respectively, above the upper run of the endless conveyor and between the parallel sections of such conveyor. Preferably the burners of the upper series are arranged in a series of compartments separated by transverse partitions 17, and above horizontally arranged baffle members 18, preferably formed of corrugated metal, which effectively protect the articles being baked from direct contact with the products of combustion of said upper burners and act to confine a suitable body of vapor generated during the baking operation about the articles to be baked.

Each of the compartments receiving the burners 15 is provided with an outlet 20, the said several outlets being connected by a common conduit 21, which, as in my earlier application referred to, is connected with a suitable suction fan. Further, each section of the corrugated baffle 18 is provided with an aperture adapted to be closed by a suitable adjustable closure 22 by manipulating which direct communication between the duct 21 and the baking chamber beneath the baffle 18 may be established or cut off, as desired.

30 designates a series of steam spray pipes which are suitably supported in the baking chamber above the conveyor therein and adjacent the inlet opening 31, through which the articles to be baked are placed upon the endless conveyor. The number and arrangement of such spray devices may be varied as desired, and the purpose or function thereof is to discharge a suitable volume of steam upon the loaves or dough masses as they begin their travel through the baking chamber, it having been found that by applying a suitable fluid coating to such masses the appearance of the baked loaves will be materially improved.

Of course, it is necessary to regulate the proportion or quantity of steam sprayed upon the articles to be baked and the surplus steam must be withdrawn from the baking chamber.

32 designates a vertically sliding door adapted to close the inlet or feed opening 31 to the baking chamber. As shown, this is of tubular form having an upwardly extending elbow section 33, which telescopically engages the lower end of a conduit 34, that is connected to a suitable exhaust fan casing 35. A plurality of apertures 36 are formed in the inner wall of the sliding door 32 adjacent the lower edge thereof, and when the fan in the casing 35 is operating the suction thereof will draw the surplus steam delivered by the spray nozzles 30 through said openings 36 and the conduit 34.

As previously noted, when all of the surplus steam is thus withdrawn from the baking chamber through the door or closure for the feeding opening thereto, there is a possibility of the steam discharged by the spraying means 30 becoming superheated by the high temperature of the gases withdrawn from the baking chamber with such steam, and this at times prevents the deposit of the desired liquid film upon the articles to be baked.

To avoid this objection the present invention provides means by which the surplus steam may be withdrawn from the baking chamber at points in rear of the spraying devices. As shown, a trunk or duct 40 extends transversely across the baking chamber in rear of the spraying devices and is provided with a series of apertures 41 and with an outlet duct 42 that communicates with the pipe 34. By this arrangement the surplus steam sprayed into the baking chamber will be more uniformly withdrawn than with the construction and arrangement of parts of my earlier application. Dampers 45, 46, located, respectively, in the conduit 34 and branch duct 42, may be adjusted to vary the size of the passage through either of these parts and thus regulate the direction in which steam is withdrawn from the baking chamber.

In some instances it may be advisable to close the damper 45 and open the damper 46 to its maximum capacity, or vice versa. Again, in baking certain character of bread, for example, it may be found desirable to adjust said dampers so that the surplus steam will be withdrawn both through the apertures 36 in the door 32 and those 41 in the duct 40.

By thus controlling the withdrawal of the steam sprayed into the baking chamber it is possible to reduce the number of spraying devices which have heretofore been required, or the amount of steam supplied to the baking chamber, and to insure that the top surfaces of the articles on the travelling conveyor will receive a liquid film coating.

As the endless conveyor passes around the sprockets 6 at the delivery end of the oven the articles being baked, or the containers therefor if such articles are not supported directly on the plate-like flights of the conveyor will be automatically discharged onto an inclined way or chute 50. When the loaves of bread are deposited directly on the conveyor flights and particularly where the flights are preliminarily sprinkled with corn meal or similar material it frequently happens that small particles adhere to the face of the flight, and if these are carried back through the baking chamber, along the lower run of the conveyor they are apt to be consumed and produce a smoke which is objectionable. Therefore, means are provided whereby after each flight of the endless conveyor has discharged its load the supporting surface of such flight is cleaned to remove any adhering particles therefrom.

As shown, the cleaning means comprises a brush 51, which is supported by suitable arms 52 from a rock shaft 53, and to said shaft are secured counterweights 54, which act to project the brush 51 toward the end wall of the baking chamber and into position to contact with the face of the conveyor flights as they severally pass from the upper to the lower run of the conveyor.

Any particles detached from the conveyor flights 13 by the brush 51 fall upon a collection wall 60, and may be removed through an aperture in an end wall interposed between the chute 50 and said collection wall, which aperture is normally closed by a door 61.

The counterweights 54 afford sufficient pressure to keep the brush 51 in suitable contact with the flights to keep them thoroughly cleaned, and it will be noted that the brush is relatively stationary not requiring any special means or utilization of power, to actuate it, as would be required if it, for example, were mounted to rotate.

It is believed that the operation and advantages of the improvements will be readily understood from the foregoing description in connection with the drawings.

In addition to serving as a means for withdrawing surplus steam or vapour from the baking chamber the duct 40 may, by proper adjustment of the several parts, serve as a means for supplying to the oven a suitable amount of relatively low temperature air which will assist in condensing the steam and thus materially reduce the amount of steam required for the purpose of properly saturating the tops of the loaves being baked.

It will be understood that many of the parts are illustrated more or less conventionally, and that the drawings, of course, are not scale drawings or designed to show the exact proportions and sizes of the parts illustrated. Modification in many of the details shown can be made without departing from the invention.

Having thus described the invention, what is claimed as new is:—

1. In a baker's oven, the combination with a baking chamber having a delivery opening in one of its walls, and an endless conveyor for transporting articles being baked through said chamber and extending through said delivery opening, said conveyor including a series of plate-like flights, of a brush positioned to have the ends of its bristles contact with the article supporting faces of the conveyor flights successively after said flights have passed through the delivery opening in the wall of the baking chamber and the baked articles have been removed from the flights.

2. In a baker's oven, the combination with a baking chamber and a conveyor for transporting articles to be baked through said chamber, said conveyor comprising two endless chains supported so that the upper run will travel in a substantially horizontal path through the baking chamber, and beyond one end thereof, and a series of plate-like flights connecting said chains, a guide-way positioned exterior of the oven adjacent the delivery end of the conveyor to receive baked articles from the flights as the latter successively pass from the upper to the lower runs of the conveyor, and a brush extending transversely across the conveyor below said guideway with the ends of its bristles positioned to contact with the article supporting faces of the conveyor flights successively after the baked articles have been removed.

3. In a baker's oven, the combination of a casing, an endless conveyor mounted to travel substantially horizontally through the casing and support the articles to be baked, said conveyor extending beyond one end of the oven, a guideway positioned to receive baked articles from the projecting end of the conveyor, a brush supported by a rock shaft extending transversely across the conveyor beneath said guideway, means acting to hold said shaft in position to cause the brush to contact with the article supporting faces of the flights successively after they have passed from the upper run of the conveyor and the baked articles are removed, and means to receive any particles removed from the flights by the blocks.

4. In a baker's oven, the combination of a baking chamber, an endless substantially horizontal conveyor for transporting the articles being baked through the baking chamber, and beyond one end thereof, the oven having at the delivery end of the conveyor a longitudinal extension the top wall of which is below the horizontal plane of the upper run of the conveyor and inclined to form substantially a continuation of the conveyor flights successively as they pass from the upper run of the conveyor, a brush within said extension of the baking chamber positioned to have its bristles make end contact with the article supporting faces of the conveyor flights successively as they pass from the upper to the lower run of the conveyor, the end wall of the extension of the baking chamber having an opening formed therein through which material removed from the flights by the brush can be withdrawn, and a closure for said opening.

In testimony whereof I have hereunto set my hand.

CORRY B. COMSTOCK.